United States Patent [19]

Nicolosi

[11] 4,122,207

[45] Oct. 24, 1978

[54] FLAVOR EXHANCER AND METHOD OF PREPARING THE SAME

[76] Inventor: Vincent Nicolosi, 17552 Ventura Blvd., Encino, Calif. 91316

[21] Appl. No.: 746,053

[22] Filed: Nov. 29, 1976

[51] Int. Cl.² .................. A23L 1/221; A23L 1/223
[52] U.S. Cl. .................. 426/615; 426/473; 426/629; 426/640; 426/650
[58] Field of Search .............. 426/289, 296, 615, 629, 426/640, 650, 655, 438, 465, 473

[56] References Cited

U.S. PATENT DOCUMENTS

| 1,619,202 | 3/1927 | Greenstreet | 426/655 X |
| 2,308,601 | 1/1943 | Gentele | 426/615 X |
| 2,785,981 | 3/1957 | Dinesen | 426/438 X |

FOREIGN PATENT DOCUMENTS 2,266,463  12/1975  France ................. 426/615

OTHER PUBLICATIONS

Kelley et al. *Food Technology*, Aug. 1955, pp. 388-392.

*Primary Examiner*—Raymond N. Jones
*Assistant Examiner*—Elizabeth A. Hatcher
*Attorney, Agent, or Firm*—Spensley, Horn, & Lubitz

[57] ABSTRACT

A composition of matter primarily including cooked, dried and pulverized artichoke may be used as a flavor enhancer for meat, fish, foul, vegetables and foods of all kinds. The flavor enhancer increases the natural flavor of the food upon which it is used without masking or adding a particularly distinctive flavor different than the food with which it is used. Minority amounts of fava beans, and escarole, similarly cooked, dried and pulverized may be combined in a mixture with the processed artichoke.

6 Claims, No Drawings

FLAVOR EXHANCER AND METHOD OF PREPARING THE SAME

BACKGROUND OF THE INVENTION

1. Field of Invention

The present invention relates to the field of food seasonings, and in particular relates to natural food seasonings incorporating as a principal ingredient, processed natural vegetable matter either in liquid or powder form.

2. Description of the Prior Art

The number of preservatives, colorings and other artificial chemicals added to food stuffs to enhance flavor or keeping quality has increased at alarming rates in recent years. The long term effects on various individuals as well as the synergistic effect with other artificial and natural components is largely unknown. In view of this suspicion of artificial flavor enhancers, there is an increased interest in natural flavor enhancers and an increased confidence in the long term nontoxicity of such natural additives.

However, the chemistry of natural additives and their combination with foods is extremely complex and not well understood. Therefore, the discovery of new natural additives and flavor enhancers has been difficult and largely based on inspired, intuitive judgments. The prior art has devised such natural additives as a mixture of processed white pepper and ginger root, U.S. Pat. No. 2,284,822, processed onion constituents, U.S. Pat. No. 1,038,334 and various mixtures of hydrolyzed soy and corn proteins, U.S. Pat. No. 3,770,463. Many of the prior art natural food additives have carried flavors of their own, or have been effective only when used in combination with certain types of foods such as beef. The degree of effectiveness of each of the prior art natural additives has also varied. What is needed is a natural food flavor enhancer which is highly effective with a large variety and types of food stuffs and which principally serve to enhance the flavor of the food to which it is added rather than adding an additional flavor.

BRIEF SUMMARY OF THE INVENTION

The present invention includes a food flavor enhancing composition of matter comprising cooked, dried and ground artichoke pulp. The composition may further comprise various minority amounts of cooked, dried and ground escarole and/or fava beans.

The composition of matter may be processed by cooking artichokes to reduce the artichokes into pulp and fiber and then to remove the pulp from the fiber. The pulp is then partially dried to form a paste. Similarly prepared fava beans and escarole may be reduced to the same paste-like state in a similar manner and the components mixed to form a composite paste. The composition of matter may also be further processed by completely drying the paste formed from the pulp to form a dry residue. The dry residue is then pulverized to form a powder. At this point, the powdered artichoke may be mixed in appropriate percentages with similarly prepared powdered escarole and fava beans. Finally, a composition may be prepared in another embodiment by following the steps of cooking the stems of artichokes, flouring the cooked stems, frying the floured and cooked stems, grinding the fried stems, drying the ground and fried stems and pulverizing the dried stems into a powder. As recited above, the various minority amounts of fava beans, escarole and other ingredients may be added in powdered form with the artichoke based food flavor enhancer.

DETAILED DESCRIPTION OF THE PREFERRED EMBODIMENTS

Monosodium glutamate is a chemical composition which is widely used as a food flavor enhancer. The success of monosodium glutamate has been largely attributed to its effectiveness to improve the flavor of a wide variety of types of food stuffs. However, monosodium glutamate is a manufactured chemical compound.

The present invention is a natural food flavor enhancer which may be effectively applied to a wide variety of foods including meats, fish, foul, vegetable and soups. The primary ingredient of the present invention is processed artichoke. Although it is not presently clearly understood, such processed artichoke when prepared as described below, coacts with the flavor producing compounds of a wide variety of food stuffs in an unexpectedly beneficial manner. To a large degree, regardless of the type of food stuff upon which the present invention is used, the natural flavor of the food upon which it is used is enhanced. It is speculated that the food flavor enhancer of the present invention may protect the flavor bearing oils, extracts, and resins of food stuffs from oxidation, decomposition or other impairment of flavor and aroma.

The present invention is based upon cooked, dried and ground or pulverized artichoke. The artichoke is a thistle-like plant of the composite family. Cynara scolymus is a typical representative although in the present invention it is to be understood that the term "artichoke" is used generally without reference to any specific specie to denote all true artichokes and plants similar or related to artichokes such as cardoons, cynara cardunculus. It is to be further understood that the edible portions of the artichoke plant are those portions which are principally included within the term "artichoke" as used herein. Typically, the flower head of the artichoke plant and its stems are considered as the edible portion.

The composition of the present invention can be applied directly to a food stuff in a dried, powdered state or in a paste or liquid-like state as prepared as described below. Furthermore, the present invention can be used as a component in a sauce or coating which may also be applied to the food stuff. The amount used will vary depending upon the particular composition chosen, the degree of flavor enhancement desired, the means of application employed, the manner in which the food stuff is being prepared, and the freshness of the food seasoning.

EXAMPLE I

This example is illustrative of the production of a food seasoning paste or liquid. The desired number of artichokes are first thoroughly cleansed and washed by means well known to the art. The artichokes may then be divided into quarters or into any other fractional components which may aid in their rapid reduction into pulp and fiber. In the present embodiment, the sectioned artichokes are reduced to pulp fiber by pressure cooking at an average of 12 to 15 psi for 15 minutes. Clearly, many of the pressures and cooking times may be employed other than the example given. The washed and sectioned artichokes are cooked with the addition of water and in some instances with the addition of salt added according to taste and general principles well known to the art. After pressure cooking or any equivalent means, the artichokes have been prepared to be separated into pulp and fiber. One embodiment of this process may include a mechanical process by which the artichokes are pressed through a grating or sieve. The soft pulp is forced through the grating or sieve leaving behind the hard and larger sized fiberous material. The separated pulp forms a green liquid-like or paste-like substance. The pulp may then be partially desiccated to drive off at least a portion of the water content to form a thick paste. In the present embodiment, this is accomplished simply by heating the liquid-like or paste-like substance and boiling at least a certain fraction of the water content off.

The processed paste will keep for a reasonable period, particularly if refrigerated, and may contain a small amount of salt if added at an earlier step. However, it is entirely within the contemplation and scope of the present invention that various additional compounds might be added in small amounts which would aid or preserve such a prepared paste inasmuch as the resulting paste is natural and may be subject to biodegradation once exposed to a nonsterile environment.

Although the artichoke paste, prepared as discussed above, may be used without the addition of any further constituents, it is further included within the scope of the invention that various minority amounts of dried fava beans and/or escarole could be added to the paste. Although there are many ways in which such additional natural elements may be added to the paste, in the present embodiment, the fava bean and escarole are washed, and reduced to pulp and fiber by pressure cooking in a similar manner as to that described above. Preparation of these additional constituents are discussed in greater detail below. A liquid-like pulp of the fava bean and escarole may then be added to the artichoke liquid-like pulp and the three constituents thoroughly mixed and desiccated into a thick paste. Alternatively, a thick paste of fava bean and escarole may be separately prepared in a manner similar to that for artichoke and the three constituents mixed when in paste form. The thickness of the paste in each case is largely a matter of choice and is controlled by controlling the percentage of water content in the resulting paste. Typically, when the paste of each of the three constituents are reduced to approximately the same water content percentage by weight, the constituents may be combined in any combination within the range of approximately 90 to 98 percent artichoke paste, 5 to 1 percent fava bean paste and 5 to 1 percent escarole paste by weight. In one particular embodiment, the constituents are combined as approximately 98 percent artichoke paste, approximately 1 percent fava bean paste and approximately 1 percent escarole paste by weight. Various additional amounts of salt may also be present including miniscule amounts of other natural or artificial constituents well known to the art.

EXAMPLE II

In a further example of the present invention, wherein natural or artificial preservatives may be omitted, the artichokes are washed, sectioned and reduced to pulp and fiber as described in Example I. The artichoke pulp, a liquid-like green substance, is then thoroughly dried to form a dry residue. In one embodiment, the artichoke pulp is spread into a thin layer, such as on parchment paper on a tray and dried in an oven at 200° F. for 2 hours. It is to be understood that many other means for drying the liquid-like pulp substance may be employed other than that recited, including vacuum or microwave desiccation. The dried residue is then ground and pulverized into a powder. In this form, the food seasoning of the present invention will keep indefinitely without the addition of further additives.

Similarly, as previously described above, skinned, dried fava bean is washed, sectioned and pressure cooked at an average of 12 - 15 psi for 15 minutes to produce a pulp. The liquid-like fava bean substance is then spread into a thin layer and desiccated. Again, such a layer might be formed on parchment paper in a tray and desiccated in an oven at 200° F. for 2 hours. The dried residue formed after desiccation of the fava bean liquid-like substance can then be ground or pulverized into a powder.

Escarole powder is prepared in a similar fashion. The escarole is washed and may be sectioned or left whole and reduced to a pulpy substance by pressure cooking at between an average of 12 to 15 psi for 15 minutes. Additional amounts of salt and water may be added according to choice. The pulp substance is then ground and dried to form a dry residue. One method in which the wet pulp substance may be dried is by spreading the pulp in a thin layer on parchment paper on a tray and dried in an oven at 200° F. for 2 hours. The dried residue is then ground or pulverized into a powder.

At this point, amounts of pulverized artichoke, fava bean and escarole powder have been prepared as described above. Although the artichoke may be used alone, in one embodiment, the three constituents together with minority amounts of salt and various other natural and artificial food stuffs may be combined in powder form and thoroughly mixed. The resulting mixture by weight is typically 90 to 98 percent artichoke powder, 5 to 1 percent fava bean powder and 5 to 1 percent escarole powder. In the present embodiment, the proportions by dry weight are approximately 98 percent artichoke powder, 1 percent fava bean powder and 1 percent escarole powder. It is entirely within the scope of the present invention that either the fava or escarole powder may be omitted. In such a case, additional artichoke powder is added as a replacement. For example, should the fava bean powder be omitted, the resulting mixture may include 95 to 99 percent artichoke powder and 5 to 1 percent escarole powder, or by weight 95 to 99 percent artichoke powder and 5 to 1 percent fava bean powder. Minority amounts of salt from prior process steps, water and other natural and artificial trace constituents may also be present.

EXAMPLE III

In another example of the present invention, cardoons may be used or stems of artichoke. In the following, it is to be understood that whenever the term "cardoon" is used, it is to include, but not to be limited to, the stem of artichoke. The cardoons are prepared by pressure cook at an average of 12 to 15 psi for 10 minutes with additional amounts of salt and water according to taste and well known principles. Clearly, other cooking methods, pressures, times and means can be equivalently employed. After cooking, the cardoons are dipped in flour and deep-fried in an oil, such as a vegetable oil, for 6 minutes. Again, any clearly equivalent means of deep fat frying cardoons may be employed without departing from the spirit and scope of the present invention. The fried and floured cardoons are then ground into a moist pulp. The pulp is desiccated, such as by spreading in a very thin layer on parchment paper and drying in an oven at 200° F. for 2 hours. The dried or desiccated pulp forms a residue which may then be ground or pulverized into a powder. As stated with respect to Examples I and II above, the dried, deep fat fried artichoke powder may be combined with the dried powder of fava beans or escarole in the mixtures recited to form the food seasoning of the present invention. In such a case, the processed cardoon is to be regarded in the above descriptions as equivalent to the processed artichoke. Clearly, minority amounts of salt and oil or residues of oil incorporated by prior process steps may be included in the resulting mixture.

Although the present invention has been specifically described with respect to three particular examples, it is to be expected that additional constituents might be added in appropriate amounts to improve the appearance or physical characteristics of the resulting paste or powder. A food flavor enhancer prepared as described above, has been empirically found to substantially increase the natural flavor of the food to which it is added and to be effective with a wide variety of food stuffs. The enhancer may be added to food stuffs in a minority proportion by volume in a paste form and in a minority proportion by weight in a powder form according to taste or in relatively a miniscule amount. Thus, the present invention is a general purpose food seasoning mainly comprised of natural ingredients added to an artichoke base. The effectiveness of such a general purpose food flavor enhancer has been somewhat surprising since it is entirely unknown that artichoke or any processed derivative product thereof has ever been used as a spice, seasoning, condiment, preservative or like. Nevertheless, the use of the composition of matter of the present invention has been uniformly superior in each application in which it has been used. Thus, it is to be understood that many other modifications and alterations may be made in the proportions and number of constituents included with the ingredients described and that the constituents described may be processed in a wide variety of equivalent means to those described without departing from the scope and spirit of the present invention.

I claim:

1. A food flavor enhancing composition comprising cooked, dried and ground artichoke pulp in the range of 90 to 98 percent by weight; cooked, dried and ground escarole in the range of 5 to 1 percent by weight; and cooked, dried and ground fava beans in the range of 5 to 1 percent by weight.

2. The composition of claim 1 wherein said artichoke pulp is processed from stems of the artichoke only.

3. The composition of claim 2 wherein said artichoke is a cardoon.

4. The composition of claim 3 wherein said cardoons are floured and deep fried before being dried and ground.

5. A process of preparing and using a food flavor enhancing composition comprising the steps of:
separately cooking artichokes, fava beans and escarole to reduce said artichokes, fava beans and escarole, into pulp and fiber;
separately removing said pulp of said artichokes, fava beans and escarole from said fiber;
separately, completely drying said pulp of said artichokes, fava beans and escarole to form a dry residue;
separately pulverizing said residue of said artichokes, fava beans and escarole to form a powder; mixing said powders of said artichokes, fava beans and escarole to comprise a mixture of said powder of artichoke in the range of 90 to 98 percent by weight, of said powder of fava beans in the range of 5 to 1 percent by weight and of said powder of said escarole in the range of 5 to 1 percent by weight; and adding said powder to a food stuff in an amount sufficient to enhance the flavor thereof.

6. A process of preparing and using a food flavor enhancing composition comprising the steps of:
separately cooking artichokes, fava beans and escarole to reduce said artichokes, fava beans, and escarole into pulp and fiber;
removing said pulp of said artichokes, fava beans and escarole from said fiber; partially drying said pulp of said artichokes, fava beans and escarole to form a paste; mixing said pastes of said artichokes, fava beans and escarole, said artichoke paste being in the range of 90 to 98 percent by weight, said fava bean paste being in the range of 5 to 1 percent by weight and said escarole paste being in the range of 5 to 1 percent by weight; and adding said paste to a food stuff in an amount sufficient to enhance the flavor thereof.

* * * * *